May 14, 1929.  J. C. BOERTLEIN  1,713,416
SULPHUR BURNING PROCESS
Filed Oct. 4, 1924
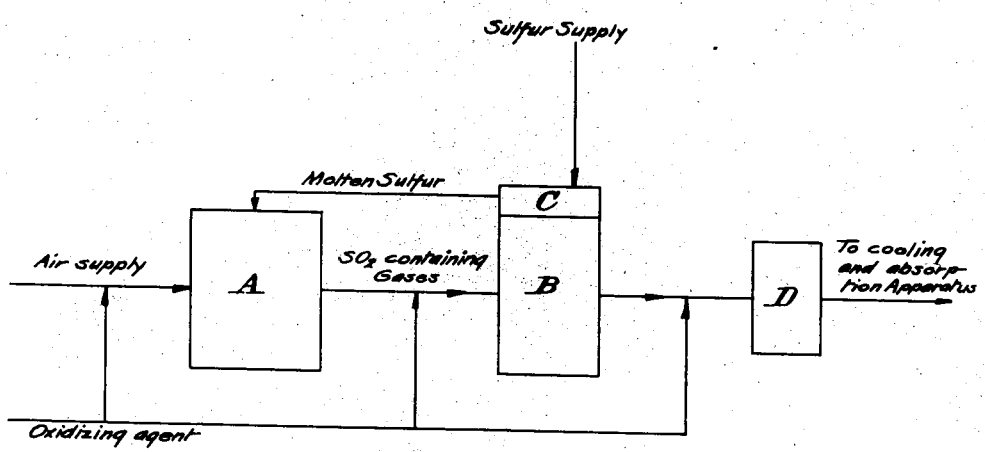
Inventor:
John C. Boertlein
By Byrnes Townsend & Brickenstein
Attorneys.

Patented May 14, 1929.

1,713,416

UNITED STATES PATENT OFFICE.

JOHN C. BOERTLEIN, OF CLEVELAND, OHIO, ASSIGNOR, BY MESNE ASSIGNMENTS, TO THE GRASSELLI CHEMICAL COMPANY, OF CLEVELAND, OHIO, A CORPORATION OF DELAWARE.

SULPHUR-BURNING PROCESS.

Application filed October 4, 1924. Serial No. 741,670.

This invention is based upon the idea of using sulphur as fuel for the operation of internal combustion engines, particularly those of the so-called Diesel type, or stated differently, the invention is based upon the idea of using internal combustion engines as sulphur burners for the production of $SO_2$-containing gases adapted for use in the manufacture of sulphuric acid by the contact or chamber process or for other known purposes. It is not feasible of course to use sulphur simply as a fuel for internal combustion engines discharging the combustion gases into the atmosphere as is customary when using other fuels such as hydrocarbon oil, and the process therefore logically must be regarded as a process of burning sulphur and the use of an internal combustion engine for that purpose, the power so developed being regarded as a by-product.

Sulphur is particularly adapted for use as fuel in liquid form in an internal combustion engine of the Diesel type in which, as is well known, a charge of air is compressed in the engine cylinder and a charge of liquid fuel injected into the highly compressed and heated air, and the invention will be described and illustrated in this connection.

In burning sulphur as fuel in an internal combustion engine it is desirable to use dry materials in order to prevent undue corrosion of the metallic parts of the engine with which the hot gases come into contact. This feature in the operation of the engine with sulphur as fuel also is of value in the use of the gases, particularly in the manufacture of sulphuric acid by the contact process in that, as has been found, dry gases may be passed directly to the contact apparatus after dry filtering if necessary or desirable to remove dust without the customary cooling, purification for the removal of sulphuric acid mist and other impurities and reheating to the converter temperature. A feature of my invention therefore is the pre-drying of the air supply to an internal combustion engine operating upon sulphur fuel in connection with the use of the gases in the contact sulphuric acid process.

To prepare the $SO_2$-containing gases produced in the internal combustion engine for use in the manufacture of sulphuric acid by the chamber process and other processes involving the chemical principles of the chamber process such as the so-called tower and spray systems, etc., my invention contemplates the introduction into the gases of oxidizers or oxygen carriers such as ozone, oxides of nitrogen, etc. Such agents may be introduced into the exhaust gases leaving the engine or they may be introduced into the engine along with the air or sulphur supply and thus assist the combustion therein in addition to assisting the completion of the oxidation of the sulphur dioxid to the trioxid in the sulphuric acid forming apparatus.

The gases leaving the engine may and usually do carry with them unburned sulphur and for the purpose of removing such elemental sulphur I prefer to pass the gases from the engine into a combustion chamber of the usual type employed in connection with elemental sulphur burners of, for instance, the Glens Falls type.

As stated above, the sulphur is supplied to the engine in liquid form and therefore must be heated and melted. For this purpose a part of the heat of the combustion gases may be employed in any suitable manner, for instance by passing the hot gases in heat transfer relation to a sulphur melting pot. The sulphur melting pot may be mounted so as to be heated by the gases exhausted from the engine before they arrive at the combustion chamber or after they leave the combustion chamber or the melting pot and combustion chamber may be combined for instance by setting the melting pot into an opening in the top wall of the combustion chamber or by forming the top of the combustion chamber as a receptacle for the sulphur to be melted. The gases leaving the combustion chamber or the sulphur melting device in case the latter is positioned after the combustion chamber, pass to a sulphuric acid plant or other apparatus in which $SO_2$-containing gases are employed.

To facilitate the clear understanding of my invention reference is made to the accompanying drawings in which the course of the materials through the several pieces of apparatus is indicated.

On the drawing, A represents the internal combustion engine, B a combustion chamber, C a sulphur melting device and D a contact converter.

The engine, A, is supplied with molten sulphur from the sulphur melting pot C or an independent pot in which the melting is brought about by the use of steam or other source of heat which, if preferred, may be used for this purpose. The engine is also supplied with air into which may be injected as indicated an oxidizing agent, provided the $SO_2$-containing gas is to be used for the manufacture of sulphuric acid by some process other than the so-called contact process. The oxidizing agent in such cases may also be injected into the gases leaving the engine and passing into the combustion chamber or into the gases leaving the combustion chamber, all as indicated. In case the gases are used to supply a contact process, no oxidizing agents would be needed. From the combustion chamber the gases pass to the converter in the case of contact process, or to the Glover tower in case of a chamber process or tower process. However, between the combustion chamber and the converter, the gases may be cooled or heated as necessary to bring them to the proper temperature and may be filtered or otherwise purified in accordance with known procedure, the necessity for the latter steps depending upon the purity of the sulphur used.

It is to be understood that my invention and the patent protection asked are not limited to the specific procedure or arrangement of apparatus described by way of illustration, excepting as may be required by the appended claims.

I claim:—

1. Process of producing $SO_2$-containing gas and generating power which comprises supplying elemental sulphur as fuel in the operation of an internal combustion engine.

2. Process of producing $SO_2$-containing gas and generating power which comprises injecting molten elemental sulphur into the combustion chamber of an operating internal combustion engine.

3. Process of producing $SO_2$-containing gas and generating power which comprises supplying an internal combustion engine with a combustible mixture of dry air and elemental sulphur.

4. Process of producing $SO_2$-containing gas and generating power which comprises drying atmospheric air and supplying the same to the intake of an internal combustion engine, and injecting molten sulphur into the combustion chamber thereof.

5. Process of producing $SO_2$-containing gas and generating power which comprises operating an internal combustion engine with molten elemental sulphur as fuel, and using the heat of the exhaust gases from the engine to melt the supply of elemental sulphur.

6. In a process for the manufacture of sulphuric acid the steps which consist in preparing an $SO_2$-containing gas and generating power by using elemental sulphur as fuel in an internal combustion engine, and adding a gaseous oxidizing agent to the air supply thereof.

7. Process of producing $SO_2$-containing gas and generating power which comprises supplying elemental sulphur as fuel and dry air in the operation of an internal combustion engine.

8. The process of producing oxides of sulphur which comprises introducing the sulphur and a combustion supporting gas into the cylinder of an internal combustion engine, securing the ignition of the sulphur and leading away the oxides of sulphur formed.

9. The process of producing oxides of sulphur which comprises introducing sulphur and a combustion supporting gas into a closed chamber in which combustion is effected under conditions adapted to produce an increased pressure within the chamber.

10. The process of producing oxides of sulphur which comprises introducing sulphur and a combustion supporting gas into a closed chamber and effecting the combustion of the sulphur therein at a velocity characteristic of an explosion.

11. The process of producing oxides of sulphur which comprises introducing the sulphur and a combustion supporting gas into a closed chamber, effecting the combustion of the sulphur therein and expanding the combustion gases adiabatically whereby a cooling effect is secured.

12. The process of producing oxides of sulphur which comprises introducing sulphur and a combustion supporting gas into a closed chamber, effecting the combustion of the gases therein, allowing the combustion gases to expand and utilizing the energy set free in the production of power.

13. The process of producing oxides of sulphur which comprises introducing the sulphur together with a combustion supporting gas into the working cylinder of an internal combustion engine, securing ignition of the sulphur when the charge in the engine cylinder is at high pressure, permitting the combustion products to expand and exhausting the combustion products in the cylinder.

14. The process of producing oxides of sulphur which comprises introducing sulphur together with a combustion supporting gas into the cylinder of an internal combustion engine, in which operates a reciprocating piston, igniting the sulphur while the sulphur and combustion supporting gas are under high compression, allowing the resulting combustion gases to expand whereby the piston performs its power stroke, causing the direction of motion of the piston to be reversed and thereby expelling the combustion gases from the cylinder.

15. The process of producing oxides of sulphur which comprises introducing sulphur and a combustion supporting gas into the cylinder of an internal combustion engine operating on the four-stroke cycle, igniting the sulphur when the piston has compressed the charge of sulphur and combustion supporting gas in the engine cylinder, allowing the combustion products to expand with resultant motion of the piston in one direction and permitting the gases to escape while the piston moves in the reverse direction.

In testimony whereof, I affix my signature.

JOHN C. BOERTLEIN.